United States Patent
Knoblach et al.

[19]

[11] Patent Number: 6,098,449
[45] Date of Patent: Aug. 8, 2000

[54] METHOD AND APPARATUS FOR PROVIDING A VOLUME OF A SUBSTANCE

[75] Inventors: Walter Knoblach, Forchheim; Klaus Franze, Nürnberg; Peter Jax, Erlangen, all of Germany

[73] Assignee: Siemens Aktiengesellschaft, Munich, Germany

[21] Appl. No.: 09/052,347

[22] Filed: Mar. 30, 1998

Related U.S. Application Data

[63] Continuation of application No. PCT/DE96/01743, Sep. 16, 1996.

[30] Foreign Application Priority Data

Sep. 29, 1995 [DE] Germany ............... 195 36 582

[51] Int. Cl.$^7$ .............. G01M 3/04; G01M 3/20
[52] U.S. Cl. ............ 73/53.01; 73/3; 73/38; 73/864.74
[58] Field of Search ............... 73/53.01, 40.5 R, 73/40.7, 38, 864.74, 3

[56] References Cited

U.S. PATENT DOCUMENTS

| | | | |
|---|---|---|---|
| 1,041,156 | 10/1912 | Payne ............... | 73/40.5 R |
| 3,600,674 | 8/1971 | Roberts et al. ....... | 324/52 |
| 3,964,292 | 6/1976 | Jackson .............. | 73/40.5 R |
| 3,983,864 | 10/1976 | Sielaff et al. ....... | 128/2 G |
| 4,134,290 | 1/1979 | Bauerle .............. | 73/40.5 R |
| 4,144,743 | 3/1979 | Covington et al. ..... | 73/40.5 R |
| 4,234,315 | 11/1980 | Scott ................ | 23/230 PC |
| 5,046,353 | 9/1991 | Thompson ............. | 73/40.7 |
| 5,301,538 | 4/1994 | Recla ................ | 73/40.5 R |
| 5,347,850 | 9/1994 | Tuma ................. | 73/49.2 |
| 5,375,457 | 12/1994 | Trapp ................ | 73/40.7 |
| 5,390,539 | 2/1995 | Mayer ................ | 73/38 |
| 5,492,004 | 2/1996 | Berg et al. .......... | 73/40.7 |
| 5,542,287 | 8/1996 | Powers ............... | 73/40.5 R |
| 5,858,195 | 1/1999 | Ramsey ............... | 204/601 |

FOREIGN PATENT DOCUMENTS

| | | |
|---|---|---|
| 0175219A1 | 3/1986 | European Pat. Off. . |
| 2431907 | 1/1976 | Germany . |
| 1004791 | 3/1983 | U.S.S.R. . |
| 2181259A | 4/1987 | United Kingdom . |

OTHER PUBLICATIONS

Japanese Patent Abstract No. 62076425 (Akira et al.), dated Apr. 8, 1987.

*Primary Examiner*—Benjamin R. Fuller
*Assistant Examiner*—J. David Wiggins
*Attorney, Agent, or Firm*—Herbert L. Lerner; Laurence A. Greenberg; Werner H. Stemer

[57] ABSTRACT

A given volume of a test substance is provided into a monitoring line which is filled with a test medium (e.g. air). The line extends along a path for determining concentration profiles of certain substances along the path. For the purpose of transporting a column of test medium through the monitoring line, the pressure in the monitoring line is increased by switching on a pressure pump or, for the same purpose—in an alternative embodiment—the pressure is reduced by switching on a suction pump. A given metering volume of the test substance is automatically released in the monitoring line when the pressure goes beyond a given pressure threshold. The release of the given metering volume of the test substance, after it has been carried along the monitoring line by the column of test medium, results in a test peak for reference reading calibration in a sensor which responds to the test substance and which is connected to the monitoring line.

16 Claims, 1 Drawing Sheet

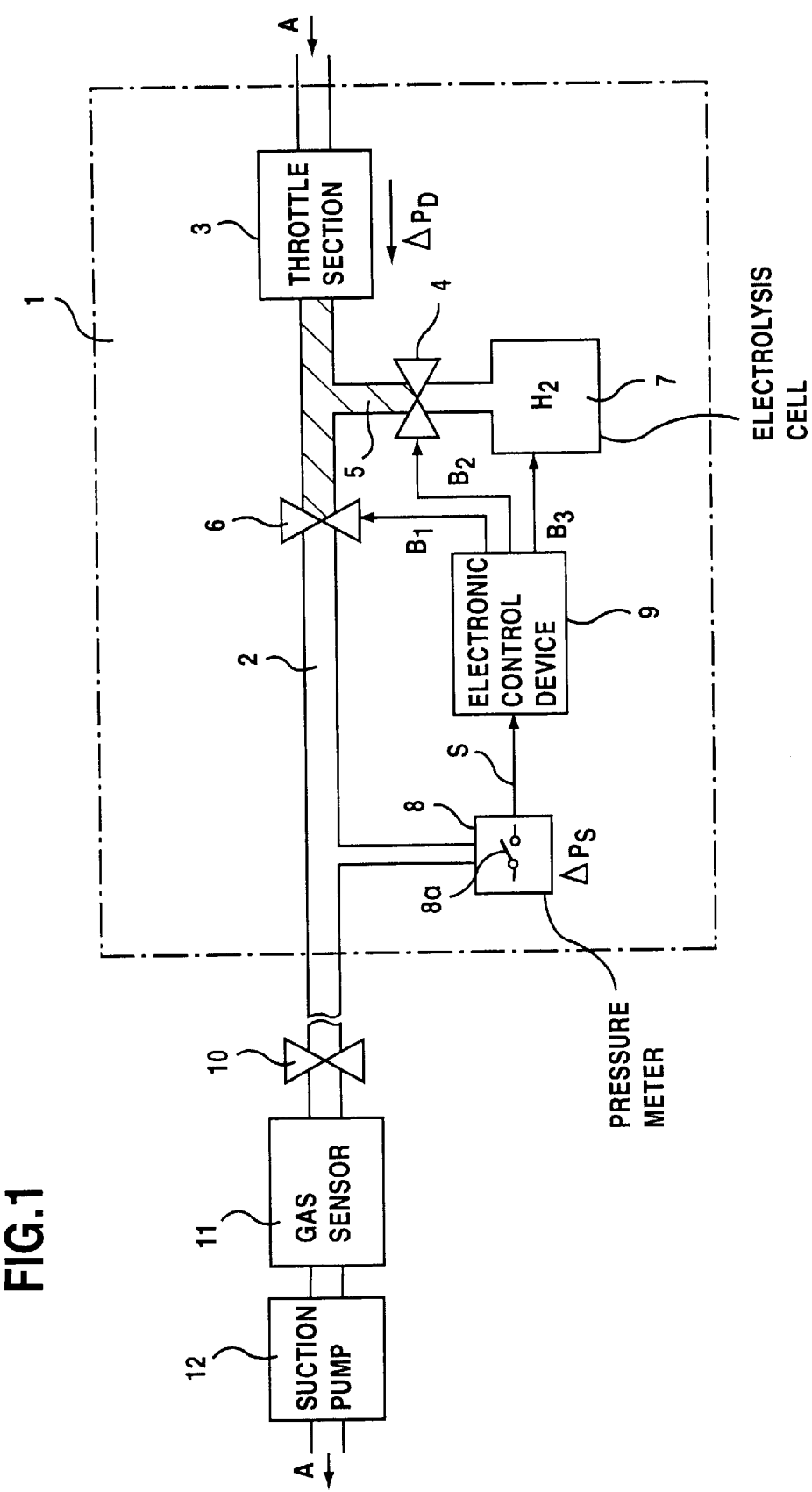

METHOD AND APPARATUS FOR PROVIDING A VOLUME OF A SUBSTANCE

CROSS-REFERENCE TO RELATED APPLICATION

This application claims foreign priority is a and continuation of international application PCT/DE96/01743, filed Sep. 16, 1996, which designated the United States as based upon German Application Serial No. 195 36 582.8, filed Sep. 29, 1995.

BACKGROUND OF THE INVENTION

1. Field of the Invention

The invention relates to a method for providing a volume of a test substance in a monitoring line which is filled with a test medium and which can be laid along a defined path for determining concentration profiles of liquid and/or gaseous substances. The invention also relates to an apparatus for carrying out the method.

2. Description of the Related Art

A method of searching for leaks has been described heretofore in German patent specification 24 31 907. There, a monitoring pipeline is laid along a path to be monitored. The monitoring line is such that liquid or gaseous (i.e., fluid) substances can permeate into its interior. The monitoring line is filled with a test medium, such as for example air. At timed intervals, the column of test medium is pushed through the monitoring line and moved past a probe (sensor) which is sensitive to the substances. Before the column of test medium is conveyed, a defined small volume of a test substance is introduced into the monitoring line as a path marker, the probe likewise being sensitive to the test substance. In this way, a test peak is generated which is used for calibration purposes in terms of both the reference path position within the monitoring tube and the reference peak amplitude of the sensor. Such test peaks can be used to increase the accuracy of detection.

In practice, the monitoring line used is a diffusion tube which is laid along the path to be monitored, for example a pipeline for crude oil or gas. The diffusion tube is filled with air as test medium. When a leak occurs in the path, the substances which have escaped from the path diffuse into the diffusion tube at the location of the leakage and thus form a marker in the column of test medium. Using a suction pump, the column of test medium is moved at timed intervals past gas sensors. In principle, a pressure pump may also be used. The recording of the pumping time against the probe signal permits the location of the leakage in the path to be established.

In order to generate the test peak and thus to calibrate the apparatus, a defined small quantity of hydrogen gas is introduced as test substance into the test medium using a metering apparatus before the test medium is extracted at one end of the path. The metering apparatus may thus be described as a test peak generator. To generate the hydrogen, an electrolysis cell may be provided, which communicates with the monitoring line through a valve. The electrolysis cell and the valve are then controlled, i.e. switched on and off, either electrically by means of cables laid along the path or by radio. Here it is possible to make use of a time control reference, i.e. the generation of a test peak is initiated at specifically set points in time.

The disadvantage of the test peak generator described for the so-called LEOS method is that it is expensive to lay cables, in particular along long paths. LEOS, which is an acronym for as "Leckerkennungs-und Ortungssytem" in German, means leak detection and location system. Controlling the electrolysis cell and the valve by radio is costly as well, because a transmitter and a receiver must be provided.

SUMMARY OF THE INVENTION

It is accordingly an object of the invention to provide a method and apparatus for providing a volume of a substance, which overcomes the above-mentioned disadvantages of the prior art devices and methods of this general type and which make it possible to provide a defined volume of a test substance to be supplied and injected into a monitoring line in a simple and cost-effective manner.

With the foregoing and other objects in view there is provided, in accordance with the invention, a monitoring method performed with a monitoring system, wherein a monitoring line filled with a test medium is placeable along a given path, and wherein concentration profiles of fluid substances which permeate into an interior of the monitoring line are determined with the monitoring system, and wherein a column of test medium is pushed at timed intervals through the monitoring line and fed to a sensor which is responsive to the fluid substances, the improvement which comprises:

determining a pressure in the monitoring line and releasing a volume of a test substance into the monitoring line as a function of the pressure. This is preferably done when the pressure exceeds or falls below a threshold pressure.

In accordance with another feature of the invention, the releasing step comprises introducing the test substance into the monitoring line by opening a first shut-off means connected between a supply container of the test substance and the monitoring line, and opening a second shut-off means connected in the monitoring line.

In other words, the objects of the invention are satisfied in that the test substance ($H_2$) is released in the monitoring line as a function of the pressure, preferably when the value exceeds or falls below a limit for the pressure. With regard to the apparatus, a device is provided, which opens the first shut-off member as a function of the pressure in the monitoring line, preferably when the value exceeds or falls below a limit for the pressure.

The invention thus primarily concerns a pressure control. The test substance is preferably released in the monitoring line, in the case of a pressure pump being used, when the value exceeds a given limit for the pressure and, in the event of a suction pump being used, when the value falls below a given limit for the pressure, in order to generate a test peak. In this way, the generation of the test peak is not controlled by time, but is controlled pneumatically and is thus carried out automatically. When the pump, which may be a great distance away, is put into operation, a negative pressure or an overpressure arises in relation to the environment, which pressure leads to the generation of a metering volume and thus to the initiation of a test peak.

This method has the advantage that it is no longer necessary to lay cables along the path or to provide a radio remote-control device, which means that a cost-effective apparatus is provided for monitoring the path.

With the above and other objects in view there is also provided, in accordance with the invention, an apparatus to be integreated into a monitoring system, which has a monitoring line filled with a test medium that is placeable along a given path, and wherein concentration profiles of fluid substances which permeate into an interior of the monitoring line are determined with the monitoring system, and wherein a column of test medium is pushed at timed intervals through the monitoring line and fed to a sensor which is responsive to the fluid substances. The apparatus for providing a volume of a test substance comprises: a supply container for a test substance, the supply container being fluidically connected to the monitoring line; a first shut-off member disposed between the supply container and the monitoring line; and a device connected to the first shut-off member for opening the first shut-off member as a function of a pressure in the monitoring line when the pressure exceeds or falls below a given pressure threshold.

The primary features of the invention may be summarized as follows with reference to a specific embodiment: The apparatus comprises a device which causes a first shut-off means to open when the value exceeds or falls below a given limit for the pressure in the monitoring line. The apparatus, therefore, is a pneumatically controlled test peak generator.

In accordance with another feature of the invention, the device includes a pressure switch issuing a control signal when the pressure exceeds or falls below the given pressure threshold. Furthermore, the above-mentioned device includes a control device which actuates the first shut-off member upon receiving the control signal.

In accordance with again another feature of the invention, there is provided a second shut-off member connected in the monitoring line, the second shut-off member being controlled as a function of a pressure. Also, the device includes a control device connected to the second shut-off member for actuating the second shut-off member. Advantageously, the second shut-off member is subsequently closed by means of the device when a predeterminable time period has expired.

In accordance with again a further feature of the invention, the supply container for the test substance is a hydrogen container or an electrolysis cell.

In accordance with again an additional feature of the invention, the device is connected to the electrolysis cell, and the electrolysis cell, upon being actuated by the device, provides a test gas, such as hydrogen gas, as the test substance.

In accordance with yet an additional feature of the invention, the supply container for the test substance is a gas cartridge, in particular a butane gas cartridge. In this case, actuation is only necessary for releasing the test substance, but not for providing it.

In accordance with yet a further feature of the invention, a throttle section is connected into the monitoring line.

In accordance with a concomitant feature of the invention, a sensor and a pump are disposed at one end of the monitoring line.

Other features which are considered as characteristic for the invention are set forth in the appended claims.

Although the invention is illustrated and described herein as embodied in a method and an apparatus for providing a volume of a substance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a schematic block diagram of a test peak generator connected to a device for determining concentration profiles of fluid substances along a given path.

DESCRIPTION OF THE PREFERRED EMBODIMENTS

Referring now to the FIGURE of the drawing in detail, there is seen an apparatus 1 according to the invention. An arrow A denotes the flow direction in a monitoring line 2 which is formed, for example, by a diffusion tube. A throttle section 3 is connectible into the line 2 for generating a pressure difference $\Delta p_D$. By means of a feed line 5, a supply container 7 for providing, generating or supplying a test substance, in the present case in the form of an electrolysis cell 7, for generating a test gas, such as hydrogen $H_2$, is connected to the monitoring line 2. A first valve 4 is connected into the feed line 5. Downstream there is a second valve 6 in the monitoring line 2. Provided downstream of the second valve 6 on one side is a pressure meter 8 with a pressure switch 8a to measure the pressure p and to determine any pressure deviation (difference between the pressure p and a given desired value) and to emit a corresponding control signal S. The pressure meter 8 is connected in terms of control to an electronic control device 9 as is shown by the arrow on the signal S. As illustrated by the signal arrows $B_1$, $B_2$ and $B_3$, the electronic control device 9 is connected to the second valve 6, the first valve 4 and to the electrolysis cell 7 respectively.

At the outlet of the apparatus 1, the monitoring line 2 is interrupted in the drawing. Here there may be a segment of line of some considerable length which is laid next to the path to be monitored. This segment of line may be several kilometers long. It serves to pick up the liquid and/or gaseous substances which have escaped in the event of leakages in the path.

Finally, a third valve 10 is disposed downstream of the apparatus 1 (in the flow direction), followed by at least one gas sensor 11 and by a suction pump 12. The components 10, 11 and 12 represent the actual operating and measurement system.

The operation of the illustrated system is as follows:

As long as no measurement is taken, the first valve 4, the second valve 6 and the third valve 10 are closed. Approximately atmospheric pressure (ambient pressure) prevails in the line 2.

At the beginning of the measurement, the remote suction pump 12 is put into operation, and the third valve 10 is opened, so that the gas volume in the monitoring line 2 is extracted past the gas sensor 11. A negative pressure or differential pressure $\Delta p_S$ thus occurs in the line 2 in relation to the environment. This negative pressure $\Delta p_S$ is recorded by the pressure meter 8 and is thus used by the pressure switch 8a for the automatic introduction of the delivery of a metering volume and thus for triggering a test peak. This is because the pressure switch 8a switches when the value falls below a given pressure threshold. The pressure switch emits a control signal S to the electronic control device 9. The pressure limit is dimensioned, in particular, so that it is smaller than the atmospheric pressure minus an amount corresponding to the anticipated air pressure fluctuations. The electronic control device 9 sets the electrolysis cell 7 in operation by means of the signal $B_3$. By means of the signal $B_2$, it also then causes the first valve 4 to open briefly. A given small volume of the test gas $H_2$ thus passes into the monitoring line 2. This is indicated by dashed lines. Then the second valve 6 is opened by means of the signal $B_1$, and the electrolysis cell 7 is switched off. With the gas column (column of air) extracted from the monitoring line 2 by the suction pump 12, the test or calibration gas fed in is conducted via the gas sensor 11. With a test peak, it thus marks the end of the column of test medium, e.g. air, in the gas sensor 11. When a predetermined period of time has expired, the electronic control device 9 closes the second valve 6.

We claim:

1. In a fluid volume producing and monitoring method performed with a monitoring system for detecting presence and concentration of fluid substances permeating into a certain region, wherein a monitoring line filled with a test medium is placeable along a given path, and wherein concentration profiles of fluid substances which permeate into an interior of the monitoring line are determined with the monitoring system, and wherein a column of test medium is pushed at timed intervals through the monitoring line and fed to a sensor which is responsive to the fluid substances, the improvement which comprises the following steps:

determining a pressure in the monitoring line; and releasing a volume of a test fluid substance into the monitoring line as a function of the pressure.

2. The method according to claim 1, wherein the releasing step comprises releasing the volume of the test fluid substance when the pressure exceeds or falls below a threshold pressure.

3. The method according to claim 1, wherein the releasing step comprises introducing the test fluid substance into the monitoring line by opening a first shut-off device connected between a supply container of the test substance and the monitoring line, and opening a second shut-off device connected in the monitoring line.

4. In a fluid volume producing and monitoring system for detecting presence and concentration of fluid substances permeating into a certain region, wherein a monitoring line filled with a test medium is placeable along a given path, and wherein concentration profiles of fluid substances which permeate into an interior of the monitoring line are determined with the monitoring system, and wherein a column of test medium is pushed at timed intervals through the monitoring line and fed to a sensor which is responsive to the fluid substances, the improvement being an apparatus for providing a volume of a test substance, comprising:

a supply container for a test substance, said supply container being fluidically connected to the monitoring line;

a first shut-off member disposed between said supply container and the monitoring line; and an actuating device connected to said first shut-off member for opening said first shut-off member as a function of a pressure in the monitoring line when the pressure exceeds or falls below a given pressure threshold.

5. The apparatus according to claim 4, wherein said device includes a pressure switch issuing a control signal when the pressure exceeds or falls below the given pressure threshold.

6. The apparatus according to claim 5, wherein said device includes a control device actuating said first shut-off member upon receiving the control signal.

7. The apparatus according to claim 4, which further comprises a second shut-off member connected in the monitoring line, said second shut-off member being controlled as a function of a pressure in the monitoring line.

8. The apparatus according to claim 7, wherein said actuating device includes a control device connected to said second shut-off member for actuating said second shut-off member.

9. The apparatus according to claim 4, wherein said supply container for the test substance is a hydrogen container.

10. The apparatus according to claim 4, wherein said supply container for the test substance is an electrolysis cell.

11. The apparatus according to claim 10, wherein said actuating device is connected to said electrolysis cell, and said electrolysis cell, upon being actuated by said device, provides a test gas as the test fluid substance.

12. The apparatus according to claim 11, wherein said electrolysis cell, upon being actuated by said device, provides hydrogen gas.

13. The apparatus according to claim 4, wherein said supply container for the test fluid substance is a gas cartridge.

14. The apparatus according to claim 4, wherein said supply container for the test fluid substance is a butane gas cartridge.

15. The apparatus according to claim 4, which comprises a throttle section connected into the monitoring line.

16. The apparatus according to claim 4, which further comprises a pump disposed at one end of the monitoring line; said sensor disposed at the one end of the monitoring line.

* * * * *